(12) United States Patent
Seksenov et al.

(10) Patent No.: US 10,866,845 B2
(45) Date of Patent: Dec. 15, 2020

(54) EXPOSING NATIVE OS APIS IN A WEB BROWSER

(71) Applicant: Microsoft Technology Licensing, LLC, Redmond, WA (US)

(72) Inventors: Kiril Nikolov Seksenov, Seattle, WA (US); Kirupa Chinnathambi, Redmond, WA (US); John-David Lewis Dalton, Woodinville, WA (US); David Risney, Redmond, WA (US)

(73) Assignee: Microsoft Technology Licensing, LLC, Seattle, WA (US)

( * ) Notice: Subject to any disclaimer, the term of this patent is extended or adjusted under 35 U.S.C. 154(b) by 0 days.

(21) Appl. No.: 15/981,812

(22) Filed: May 16, 2018

(65) Prior Publication Data

US 2019/0354417 A1    Nov. 21, 2019

(51) Int. Cl.
*H04L 5/20* (2006.01)
*G06F 9/54* (2006.01)

(52) U.S. Cl.
CPC .................... *G06F 9/547* (2013.01)

(58) Field of Classification Search
CPC ...................................... G06F 9/547
See application file for complete search history.

(56) References Cited

U.S. PATENT DOCUMENTS

| 2012/0266141 | A1* | 10/2012 | Fanning | G06F 8/43 717/126 |
| 2014/0365862 | A1* | 12/2014 | Qu | G06F 9/548 715/234 |
| 2015/0020084 | A1* | 1/2015 | Pierson | G06F 9/542 719/328 |

OTHER PUBLICATIONS

"International Search Report and Written Opinion Issued in PCT Application No. PCT/US19/030778", dated Jun. 25, 2019,12 Pages.
Arno Puder et al., "Exposing Native Device APIs to Web Apps", MOBILESoft '14 Conference, Jun. 2-3, 2014, 9 pages, Hyderabad, India.

* cited by examiner

*Primary Examiner* — Andy Ho
*Assistant Examiner* — Abdou K Seye

(57) ABSTRACT

According to one set of embodiments, a computer system can expose, to a non-native software program running in a web browser of the computer system, one or more native OS APIs implemented by an OS of the computer system, where the exposing enables the non-native software program to invoke the one or more native OS APIs as part of its execution within a runtime environment provided by the web browser.

18 Claims, 4 Drawing Sheets

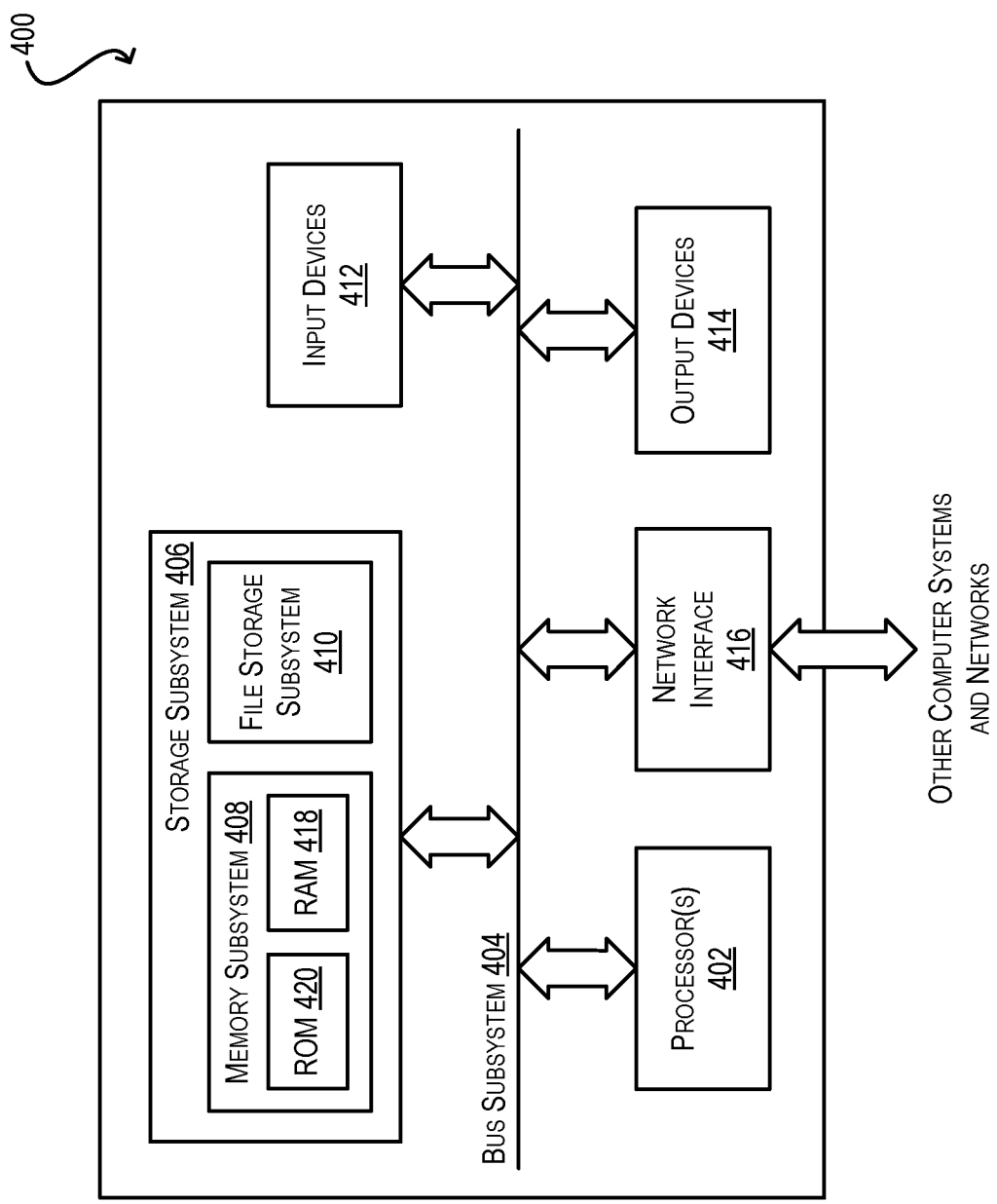

US 10,866,845 B2

EXPOSING NATIVE OS APIS IN A WEB BROWSER

BACKGROUND

Client-side JavaScript programs that run in a web browser currently have access to two types of application programming interfaces (APIs): (1) browser APIs that are implemented by the web browser itself and (2) third-party APIs that are implemented in bundled libraries/frameworks or as web services. Examples of (1) include standardized APIs, such as core JavaScript and Document Object Model (DOM) APIs, and browser-specific APIs. Examples of (2) include e.g., JQuery, Google Maps APIs, Twitter APIs, and so on.

While browser APIs and third-party APIs provide a solid range of functionality to web application developers, in some cases the operating system (OS) platform on which the web browser runs may implement APIs that offer features beyond and/or superior to what is provided by browser and third-party APIs. Unfortunately, there is no existing mechanism that allows such native OS APIs to be invoked by JavaScript programs running in a web browser.

SUMMARY

According to one set of embodiments, a computer system can expose, to a non-native software program running in a web browser of the computer system, one or more native OS APIs implemented by an OS of the computer system, where the exposing enables the non-native software program to invoke the one or more native OS APIs as part of its execution within a runtime environment provided by the web browser.

BRIEF DESCRIPTION OF THE DRAWINGS

FIG. 4 is a simplified block diagram of the architecture of a computer system according to certain embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for exposing native OS APIs—in other words, APIs that are implemented at the OS level—to non-native software programs (e.g., JavaScript programs) running in a web browser. With these techniques, such software programs can invoke the native OS APIs as part of their execution, which in turn enables the programs to incorporate OS-supported features (e.g., user interface (UI) features, user input/output, data access and storage, graphics and multimedia, etc.) in a manner similar to native applications.

The foregoing and other aspects of the present disclosure are described in further detail in the sections that follow.

2. System Environment

Figure 1:
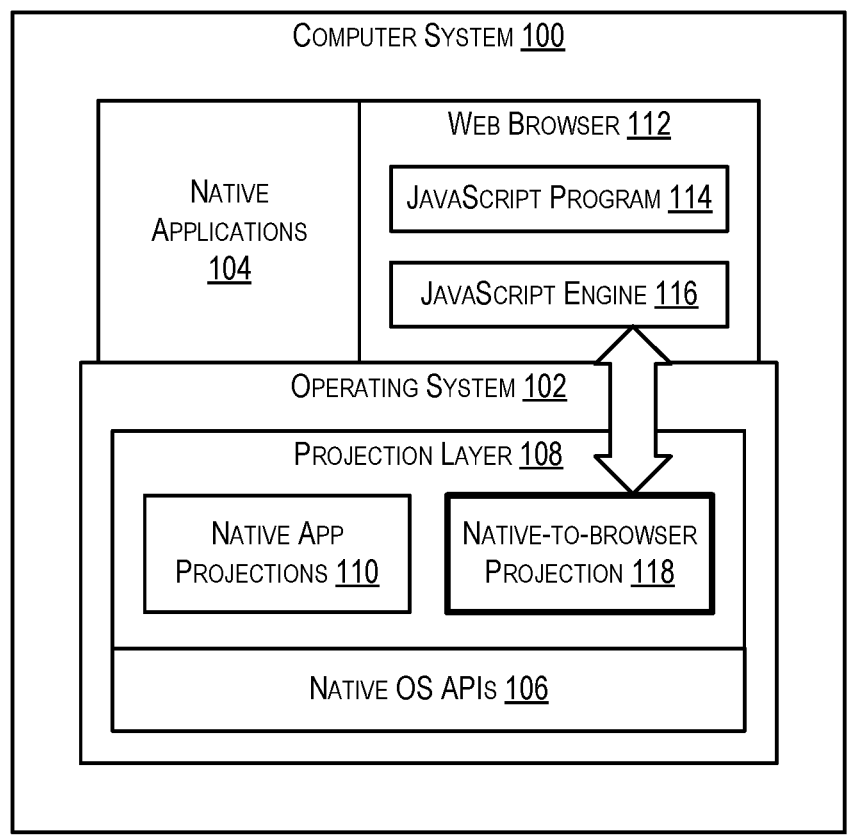
FIG. 1 is a simplified block diagram of a system environment according to certain embodiments.

FIG. 1 depicts a computer system 100 that implements the techniques of the present disclosure according to certain embodiments. As shown, computer system 100 includes an operating system (OS) 102 that provides an environment in which one or more native applications 104 can run. OS 102 may be, e.g., a desktop OS such as Microsoft Windows, Apple MacOS, or Linux, or a mobile OS such as Google Android or Apple iOS. Native applications 104 may comprise any type of software application that is specifically written to run on OS 102. For example, if OS 102 is Microsoft Windows 10, native applications 104 may comprise Universal Windows Platform (UWP) applications and legacy Win32 applications.

Since native applications 104 are designed to run on OS 102, each native application 104 has access to (i.e., can invoke) a set of native OS APIs 106 that are implemented by OS 102. Examples of such native OS APIs include APIs for creating/manipulating UI elements, processing user input (e.g., stylus input, touch input, voice recognition, etc.), interacting with system hardware such as GPS, cameras, biometric sensors, storage devices, etc., and so on. In embodiments where OS 102 is Windows 10, native OS APIs 106 can correspond to Windows Runtime (WinRT) APIs and Win32 APIs.

Generally speaking, native applications 104 can be written in a variety of different programming languages (e.g., C, C++, C #, Java, JavaScript, etc.), which may differ from the programming language(s) used to create/define native OS APIs 106. Accordingly, to facilitate interoperation between native applications 104 and native OS APIs 106, OS 102 also implements a language projection layer 108. Language projection layer 108 comprises a set of projections 110 (also known as "bindings") that handle language conversions (e.g., type conversions, syntax conversions, etc.) between native application languages and the language(s) used by native OS APIs 106. Thus, with projections 110, language projection layer 108 can ensure that native applications 104 can properly interface with native OS APIs, even though they may be written in different languages.

As noted the Background section, although native software applications can invoke native OS APIs, software programs that run within the context of a web browser currently cannot. For example, as shown in FIG. 1, computer system 100 includes a web browser 112 that is configured to execute a JavaScript program 114. JavaScript program 114 may be a client-side component of a web application (e.g., part of a web site) that has been downloaded by web browser 112. Although web browser 112 itself can be a native application with respect to OS 102, JavaScript program 114 is non-native because it is not designed to run solely on OS 102; instead, program 114 is designed to run in a web browser-based runtime environment/engine (such as JavaScript engine 116 shown in FIG. 1) on top of any underlying OS. Accordingly, in existing implementations, JavaScript program 114 and other similar non-native web programs/applications do not have any visibility or access to native OS APIs 106. Rather, JavaScript program 114 can only invoke certain APIs that are implemented by web browser 112 or in third-party JavaScript libraries/frameworks/web services that are accessible to web browser 112.

To address this limitation, computer system 100 is enhanced to include a novel "native-to-browser" projection component 118 as shown in FIG. 1. Native-to-browser projection component 118 is depicted as being a part of language projection layer 108, but in other embodiments native-to-browser projection component 118 may be implemented elsewhere in the software stack of computer system 100, such as within another part of OS 102 or within web browser 112.

As described in further detail below, native-to-browser projection component 118 can act as an intermediary between native OS APIs 106 and JavaScript engine 116 of web browser 112 and, in doing so, can expose native OS APIs 106 (or a curated portion thereof) to JavaScript program 114, thereby allowing JavaScript program 114 to invoke the exposed APIs as part of its execution code path. For instance, upon initialization of JavaScript engine 116/web browser 112, native-to-browser projection component 118 can communicate a predefined list of native OS APIs to JavaScript engine 116. JavaScript engine 116 can, in turn, make this list of native OS APIs available to JavaScript program 114 for invocation. Finally, when JavaScript program 114 invokes a particular exposed native OS API, the invocation can be mapped to its OS-level implementation via native-to-browser projection component 118 and can be executed.

With native-to-browser projection component 118, web application developers can advantageously leverage the native APIs of OS 102 in their client-side (i.e., web browser) program code in order to implement OS-supported features that are may be too difficult or inefficient to implement via standard browser or third-party JavaScript APIs. Further, as native OS APIs 106 are expanded and enhanced, web application developers will automatically have access to those improved versions for use in their web applications. Accordingly, the techniques of the present disclosure significantly increase the range of functionality that is available to such developers, with minimal or no changes to the standard web development workflow.

It should be appreciated that the system environment shown in FIG. 1 is illustrative and not intended to limit the embodiments of the present disclosure. For example, although FIG. 1 depicts a single native-to-browser projection component 118 that interfaces with JavaScript engine 116 of web browser 112, in some embodiments computer system 100 may include a plurality of such components (one per type of programming language used by programs running in web browser 112). For example, if web browser 112 is configured to run three different language runtime environments/engines, system 100 may include three separate native-to-browser projection components respectively. Further, the various entities shown in FIG. 1 may be arranged according to different configurations or may include subcomponents or functions that are not specifically described. One of ordinary skill in the art will recognize other variations, modifications, and alternatives.

3. High-Level Workflow

Figure 2:
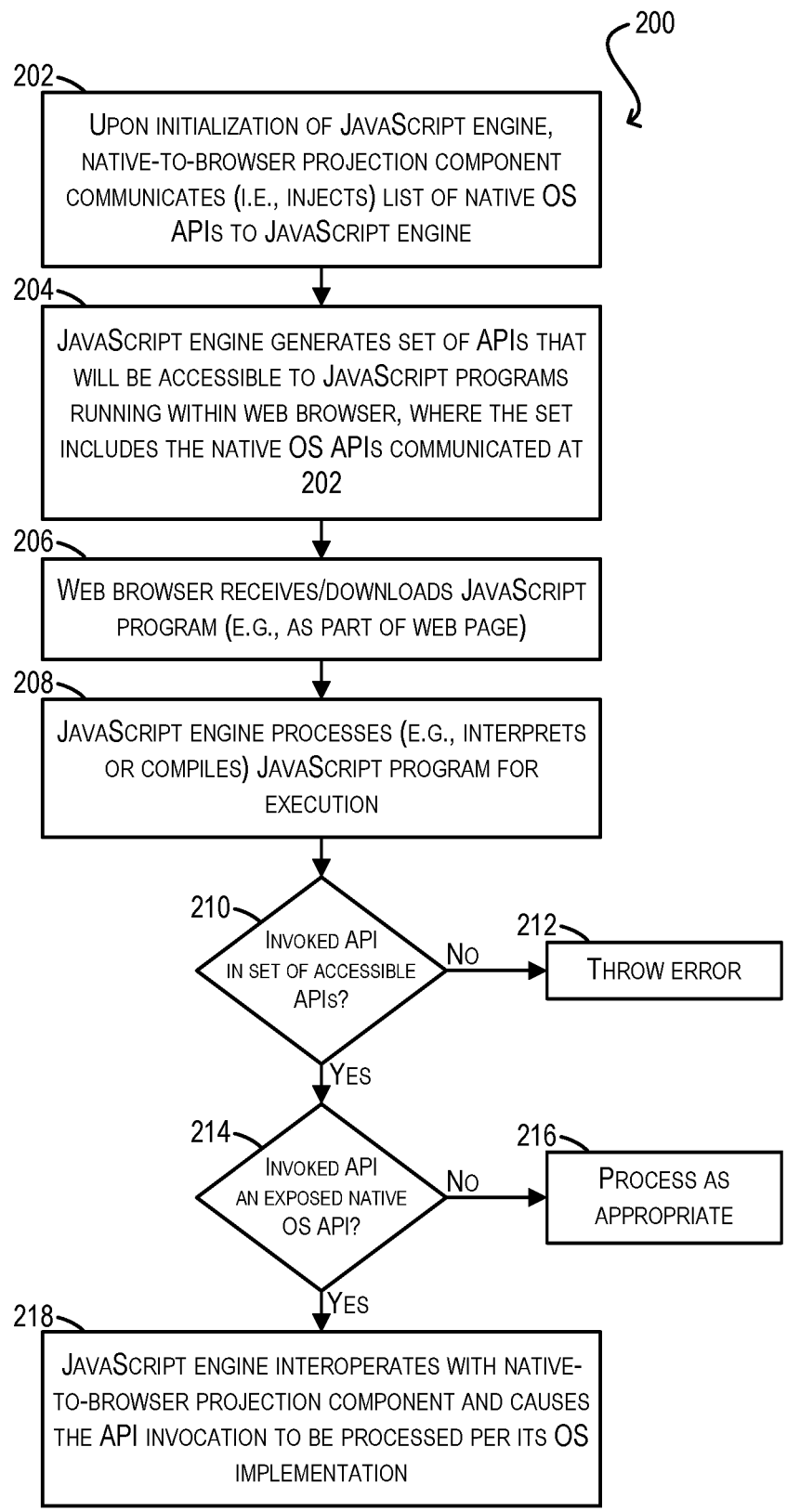
FIG. 2 depicts a high-level workflow for exposing native OS APIs in a web browser according to certain embodiments.

FIG. 2 depicts a high-level workflow 200 that may be executed by native-to-browser projection component 118 and JavaScript engine 116/web browser 112 of FIG. 1 for exposing native OS APIs 106 for use by JavaScript program 114 according to certain embodiments. Workflow 200 assumes that native-to-browser projection component 118 has been registered to interoperate with JavaScript engine 116.

Starting with block 202, upon initialization of JavaScript engine 116 (which may occur at, e.g., the startup/launch of web browser 112), native-to-browser projection component 118 can communicate (or in other words, "inject") a list of native OS APIs 106 to JavaScript engine 116, where the list comprises those APIs that should be made accessible to JavaScript programs running on JavaScript engine 116 within web browser 112. In one set of embodiments, native-to-browser projection component 118 can inject the entire namespace of native OS APIs 106, such that every API 106 is made accessible. In other embodiments, native-to-browser projection component 118 may inject only a particular subset of native OS APIs (discussed in section (4) below). As part of this step, native-to-browser projection component 118 may perform any conversions that are needed to properly represent the interfaces of native OS APIs 106 in JavaScript.

At block 204, JavaScript engine 116 can generate a set of APIs that will be accessible to JavaScript programs running within the engine. This set will generally include the list of native OS APIs injected by native-to-browser projection component 118 at block 202, as well as APIs that are implemented within web browser 112 (i.e., browser APIs) and third-party APIs that are implemented within JavaScript libraries or frameworks that are accessible to web browser 112.

At blocks 206 and 208, web browser 112 can receive/download JavaScript program 114 (as part of, e.g., a web page) and JavaScript engine 116 can process the program for execution. In embodiments where JavaScript engine 116 utilizes interpretation, this can involve sequentially interpreting and executing each line of code in JavaScript program 114. In embodiments where JavaScript engine 116 utilizes just-in-time compilation, this can involve compiling JavaScript program 114 into executable bytecode and then executing the bytecode.

As part of the processing at block 208, at the time of encountering an invocation of an API, JavaScript engine 116 can check whether the API is within the set of accessible APIs generated at block 204 (block 210). If not, JavaScript engine 116 can throw an error (block 212).

On the other hand, if the invoked API is within the set of accessible APIs, a further check can be made to determine whether the API is one of the native OS APIs included in the list injected by native-to-browser projection component 118 (block 214). If not, JavaScript engine 116 can process the API invocation as appropriate (block 216). For instance, if the invoked API is a browser API, engine 116 can execute/compile the API as implemented by web browser 112. Similarly, if the invoked API is a third-party API, engine 116 execute/compile the API per its implementation in a third-party library or framework.

Finally, if the invoked API is a native OS API that is included in the list injected by native-to-browser projection component 118, JavaScript engine 116 can interoperate with component 118 and thereby cause the invoked API to be executed or compiled into executable bytecode via its native implementation within OS 102 (block 218). For example, in one set of embodiments, this can involve routing the API invocation to native-to-browser projection component 118, which can map the invocation to the corresponding implementation in OS 102.

4. Limiting the List of Exposed APIs

In some cases, the developers of OS 102 may not want to expose the entire namespace of native OS APIs 102 to JavaScript program 114 and other such non-native programs running within a web browser. For example, since JavaScript program 114 may be downloaded from unknown and potentially malicious sources on the World Wide Web, exposing certain native OS APIs may pose a security risk. As another example, certain native OS APIs may simply be deemed inappropriate or not useful for web-based applications.

Figure 3:
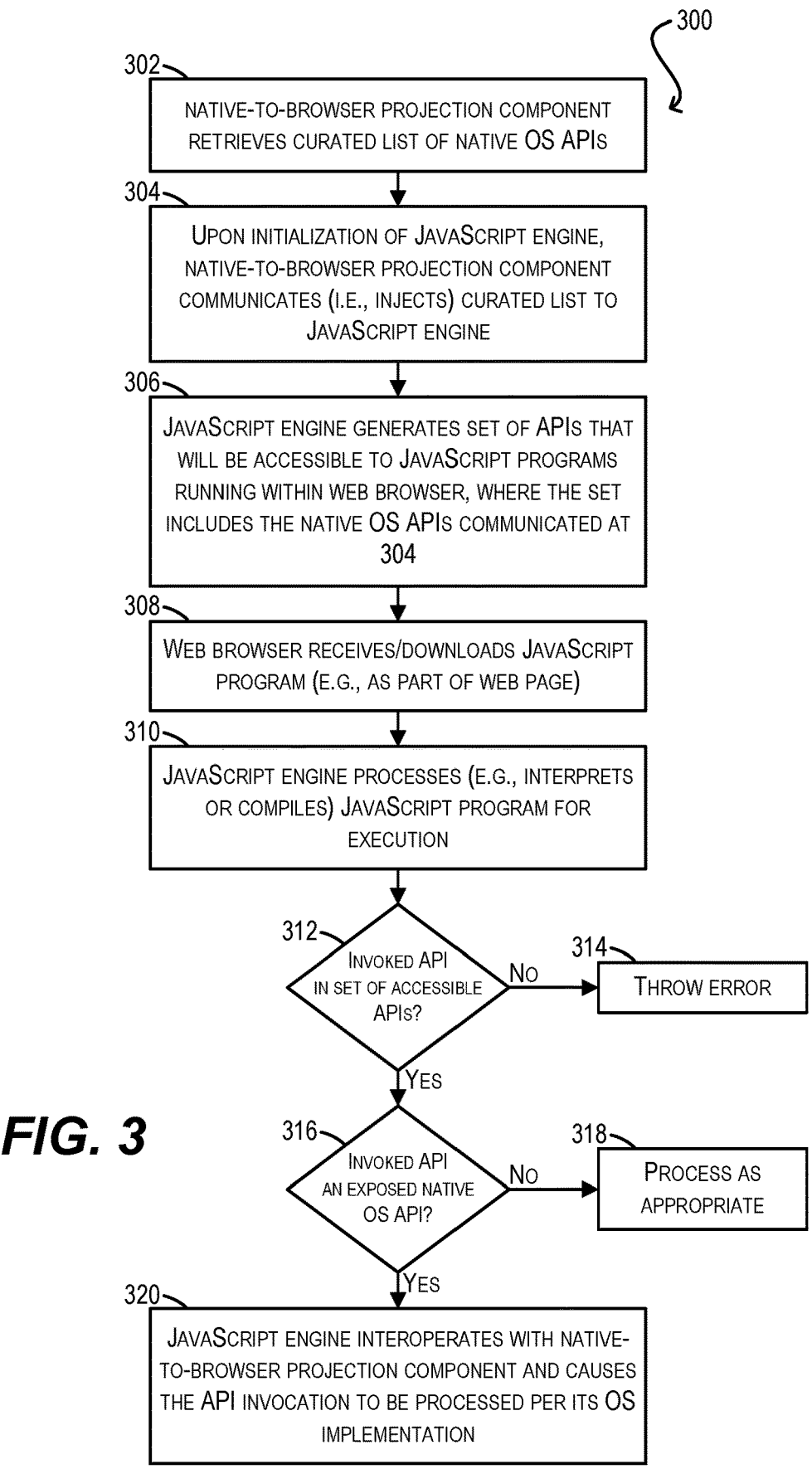
FIG. 3 depicts an alternative version of the workflow of FIG. 2 according to certain embodiments.

To address this, FIG. 3 depicts a modified version (300) of workflow 200 of FIG. 2 according to certain embodiments. The steps of workflow 300 are generally similar to workflow 200, but prior to injecting the list of native OS APIs into JavaScript engine 116 at block 304, native-to-browser projection component 118 can retrieve a predefined (i.e., curated) subset of native OS APIs that should be injected (block 302). This curated subset may be defined by, e.g., the developers of OS 102 and may be represented as one or more portions of the overall API namespace or as a listing of specific APIs.

Upon retrieving the curated subset, native-to-browser projection component 118 can inject the subset (rather than all of native OS APIs 106) into JavaScript engine 116 (block 304). Workflow 300 can then proceed in a manner similar to workflow 200. In this way, native-to-browser projection component 118 can still increase the range of functionality that is available to web applications by providing native OS API access, but can do so in a controlled manner that minimizes the potential for security risks or other problems.

5. Example Computer System Architecture

FIG. 4 depicts an example architecture of a computer system or device 400 according to certain embodiments. Computer system 400 (and/or equivalent systems/devices) may be used to implement computer system 100 of FIG. 1. As shown in FIG. 4, computer system 400 includes one or more processors 402 that communicate with a number of peripheral devices via a bus subsystem 404. These peripheral devices include a storage subsystem 406 (comprising a memory subsystem 408 and a file storage subsystem 410), user interface input devices 412, user interface output devices 414, and a network interface subsystem 416.

Bus subsystem 404 can provide a mechanism for letting the various components and subsystems of computer system 400 communicate with each other as intended. Although bus subsystem 404 is shown schematically as a single bus, alternative embodiments of the bus subsystem can utilize multiple busses.

Network interface subsystem 416 can serve as an interface for communicating data between computer system 400 and other computer systems or networks. Embodiments of network interface subsystem 416 can include, e.g., an Ethernet module, a Wi-Fi and/or cellular connectivity module, and/or the like.

User interface input devices 412 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 400.

User interface output devices 414 can include a display subsystem and/or non-visual output devices such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 400.

Storage subsystem 406 includes a memory subsystem 408 and a file/disk storage subsystem 410. Subsystems 408 and 410 represent non-transitory computer-readable storage media that can store program code and/or data that provide the functionality of embodiments of the present disclosure.

Memory subsystem 408 includes a number of memories including a main random access memory (RAM) 418 for storage of instructions and data during program execution and a read-only memory (ROM) 420 in which fixed instructions are stored. File storage subsystem 410 can provide persistent (i.e., non-volatile) storage for program and data files, and can include a magnetic or solid-state hard disk drive, an optical drive along with associated removable media (e.g., CD-ROM, DVD, Blu-Ray, etc.), a removable or non-removable flash memory-based drive, and/or other types of storage media known in the art.

It should be appreciated that computer system 400 is illustrative and other configurations having more or fewer components than computer system 400 are possible.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims.

For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system comprising:
a processor; and
a computer readable storage medium having stored thereon program code that, when executed by the processor, causes the processor to:
inject, via a projection component of an operating system (OS) of the computer system, a list of one or more native OS application programming interfaces (APIs) into a language runtime engine running in a web browser of the computer system, wherein the one or more native OS APIs are APIs implemented by the OS and are distinct from APIs implemented within the web browser, wherein the language runtime engine provides a runtime environment for executing a non-native software program within the web browser, and wherein the injecting includes converting interfaces of the one or more native OS APIs into representations understood by the language runtime engine;
generate, via the language runtime engine running in the web browser, a set of APIs accessible to the non-native software program, the set of APIs including the one or more native OS APIs injected via the projection component and one or more of the APIs implemented within the web browser;

receive, via the language runtime engine running in the web browser, an invocation of a native OS API in the set of APIs from the non-native software program; and execute, via the projection component, the native OS API invoked by the non-native software program.

2. The computer system of claim 1 wherein the one or more native OS APIs are part of a curated subset of native OS APIs selected for use by the non-native software program.

3. The computer system of claim 2 wherein the curated subset is selected by a developer of the OS.

4. The computer system of claim 1 wherein the non-native software program is a JavaScript program downloaded via the web browser and wherein the language runtime engine is a JavaScript runtime engine.

5. The computer system of claim 1 wherein the list of the one or more native OS APIs is injected into the language runtime engine of the web browser at a time of initialization of the language runtime engine.

6. The method of claim 1 wherein executing, via the projection component, the native OS API invoked by the non-native software program comprises:

compiling the native OS API into bytecode executable by the language runtime engine.

7. The method of claim 1 wherein executing, via the projection component, the native OS API invoked by the non-native software program comprises:

mapping the invocation of the native OS API to an implementation of the native OS API within the OS of the computer system.

8. A method comprising:

injecting, by a computer system via a projection component of an operating system (OS) of the computer system, a list of one or more native OS application programming interfaces (APIs) into a language runtime engine running in a web browser of the computer system, wherein the one or more native OS APIs are APIs implemented by the OS and are distinct from APIs implemented within the web browser, wherein the language runtime engine provides a runtime environment for executing a non-native software program within the web browser, and wherein the injecting includes converting interfaces of the one or more native OS APIs into representations understood by the language runtime engine;

generating, by the language runtime engine running in the web browser, a set of APIs accessible to the non-native software program, the set of APIs including the one or more native OS APIs injected via the projection component and one or more of the APIs implemented within the web browser;

receiving, by the language runtime engine running in the web browser, an invocation of a native OS API in the set of APIs from the non-native software program; and executing, by the projection component, the native OS API invoked by the non-native software program.

9. The method of claim 8 wherein the one or more native OS APIs are part of a curated subset of native OS APIs selected for use by the non-native software program.

10. The method of claim 9 wherein the curated subset is selected by a developer of the OS.

11. The method of claim 8 wherein the non-native software program is a JavaScript program downloaded via the web browser and wherein the language runtime engine is a JavaScript runtime engine.

12. The method of claim 8 wherein the list of the one or more native OS APIs is injected into the language runtime engine of the web browser at a time of initialization of the language runtime engine.

13. A non-transitory computer readable storage medium having stored thereon program code executable by a computer system, the program code causing the computer system to:

inject, via a projection component of an operating system (OS) of the computer system, a list of one or more native OS application programming interfaces (APIs) into a language runtime engine running in a web browser of the computer system, wherein the one or more native OS APIs are APIs implemented by OS and are distinct from APIs implemented within the web browser, wherein the language runtime engine provides a runtime environment for executing a non-native software program within the web browser, and wherein the injecting includes converting interfaces of the one or more native OS APIs into representations understood by the language runtime engine;

generate, via the language runtime engine running in the web browser, a set of APIs accessible to the non-native software program, the set of APIs including the one or more native OS APIs injected via the projection component and one or more of the APIs implemented within the web browser;

receive, via the language runtime engine running in the web browser, an invocation of a native OS API in the set of APIs from the non-native software program; and execute, via the projection component, the native OS API invoked by the non-native software program.

14. The non-transitory computer readable storage medium of claim 13 wherein the one or more native OS APIs are part of a curated subset of native OS APIs selected for use by the non-native software program.

15. The non-transitory computer readable storage medium of claim 14 wherein the curated subset is selected by a developer of the OS.

16. The non-transitory computer readable storage medium of claim 13 wherein the non-native software program is a JavaScript program downloaded via the web browser and wherein the language runtime engine is a JavaScript runtime engine.

17. The non-transitory computer readable storage medium of claim 13 wherein the a list of the one or more native OS APIs is injected into the language runtime engine of the web browser at a time of initialization of the language runtime engine.

18. The non-transitory computer readable storage medium of claim 13 wherein the projection component is configured to interoperate with the language runtime engine and defined within a language projection layer of the OS.

* * * * *